United States Patent
Schulz et al.

(10) Patent No.: US 7,228,998 B1
(45) Date of Patent: Jun. 12, 2007

(54) HAMMER TACKER, AND TACK THEREFOR

(75) Inventors: Jack A. Schulz, Monett, MO (US); Sam D Hammond, Florissant, MO (US); Kent F. Schien, Chesterfield, MO (US)

(73) Assignee: High Wind Products, Inc., Monett, MO (US)

( * ) Notice: Subject to any disclaimer, the term of this patent is extended or adjusted under 35 U.S.C. 154(b) by 0 days.

(21) Appl. No.: 10/996,616

(22) Filed: Nov. 23, 2004

Related U.S. Application Data (63) Continuation of application No. 10/888,528, filed on Jul. 8, 2004, now abandoned.

(60) Provisional application No. 60/485,533, filed on Jul. 8, 2003.

(51) Int. Cl.
*B25C 5/10* (2006.01)
*B25C 5/16* (2006.01)
*F16B 15/02* (2006.01)
*F16B 15/08* (2006.01)

(52) U.S. Cl. .................. 227/147; 227/145; 227/110; 411/444

(58) Field of Classification Search ............ 227/147, 227/110, 145; 411/444, 442, 439
See application file for complete search history.

(56) References Cited

U.S. PATENT DOCUMENTS

| | | | | |
|---|---|---|---|---|
| 2,655,963 | A | | 10/1953 | Dell .......................... 145/61 |
| 4,089,099 | A | * | 5/1978 | Nivet ........................ 29/811.2 |
| 4,196,836 | A | * | 4/1980 | Becht ........................ 227/110 |
| 4,204,625 | A | * | 5/1980 | Glenn ........................ 227/76 |
| 5,664,722 | A | * | 9/1997 | Marks ........................ 227/132 |
| 5,927,922 | A | | 7/1999 | Miller ........................ 411/444 |

* cited by examiner

*Primary Examiner*—Rinaldi I. Rada
*Assistant Examiner*—Gloria R. Weeks
(74) *Attorney, Agent, or Firm*—Jonathan A. Bay (57) ABSTRACT

A hammer tacker has a strike, a tack-driving piston, a tack-feeding mechanism, and a handle for a user to cause a strike against a target. The piston cycles between drive and retraction strokes. The tack-feeding mechanism cycles between recession and feed strokes to feed the tack in a next-to-lead position to the lead position after the preceding tack in the lead position is struck into the target, and includes an escaping driver for engaging a pallet of the tack in the next-to-lead position during the feed stroke to feed that tack to the lead position, as well as for escaping the pallet of that tack during the recession stroke and then receding to engage the pallet of the tack that succeeds to the next-to-lead position, if any. Wherein as the piston's drive stroke coincides with the recession stroke, the feed stroke lags after a pause behind the piston's retraction stroke.

14 Claims, 8 Drawing Sheets

HAMMER TACKER, AND TACK THEREFOR

CROSS-REFERENCE TO RELATED APPLICATION(S)

This application is a continuation of U.S. patent application Ser. No. 10/888,528, filed Jul. 8, 2004 now abandoned, which claims the benefit of U.S. Provisional Application No. 60/485,533, filed Jul. 8, 2003, all of which disclosures are incorporated herein by reference.

BACKGROUND AND SUMMARY OF THE INVENTION

The invention generally relates to a manual hammer tacker for striking a procession of inventive fasteners or tacks on a repetitive and highly efficient basis. Such tacks are characterized by, among other things, a broad flat head that is particularly effective for fastening soft, thin, membrane materials, such as vapor wraps like Tyvek®. In accordance with the present invention, the hammer tacker disclosed herein is particularly improved for more dependable and reliable operability, especially on vertical surfaces in contrast to flat or gently sloping surfaces.

The hammer tacker in accordance with the present invention is the culmination to date of a development project extending back over time that included several prototype versions, two of which are disclosed in commonly-owned U.S. Pat. No. 5,927,922, entitled "Tack, Hammer Tacker Therefor, and Method," the disclosure of which is incorporated fully herein by this reference. A third prototype version is disclosed in connection with FIGS. 1-3 hereof. These three prototype versions form a thread of design strategy which has been significantly abandoned in favor of the hammer tacker in accordance with the present invention.

The first version in this thread of three is shown and described in connection with FIGS. 2-5 as well as 10a-15b of U.S. Pat. No. 5,927,922; the second version in connection with FIGS. 16-18 of U.S. Pat. No. 5,927,922. All three of the prototype versions are either more particularly described in (or can be sufficiently "particularly" reckoned by reference to) U.S. Pat. No. 5,927,922.

These three prototype versions essentially share the following characteristics. They all utilize a "double parallelogram" leaf spring as the main workhorse for the tack-driving mechanism. Also, they all utilize a tack-feeding mechanism that reaches around from an origin above the tack heads to push the tacks by contact underneath their heads, and thus by their legs (or more accurately, shanks). As an aside, the previous reference directions "above" and "underneath" are referenced relative to the tacks' heads and shanks merely for convenience in this description and otherwise do not limit the use of the hammer tacker to any particular orientation, even upside down if possible, as against a ceiling.

Versions two and three of the prototypes represent comparable projects of debugging bugs that were found in each's previous iteration. Version three hereof represents the most advanced and comparatively debugged version of this thread. Nevertheless it still retains, or else gave arise to new, bugs which appear to have no simple fixes. Hence, this design thread was sort of abandoned in favor of proceeding a different way, and as in accordance with the invention.

Figure 1:
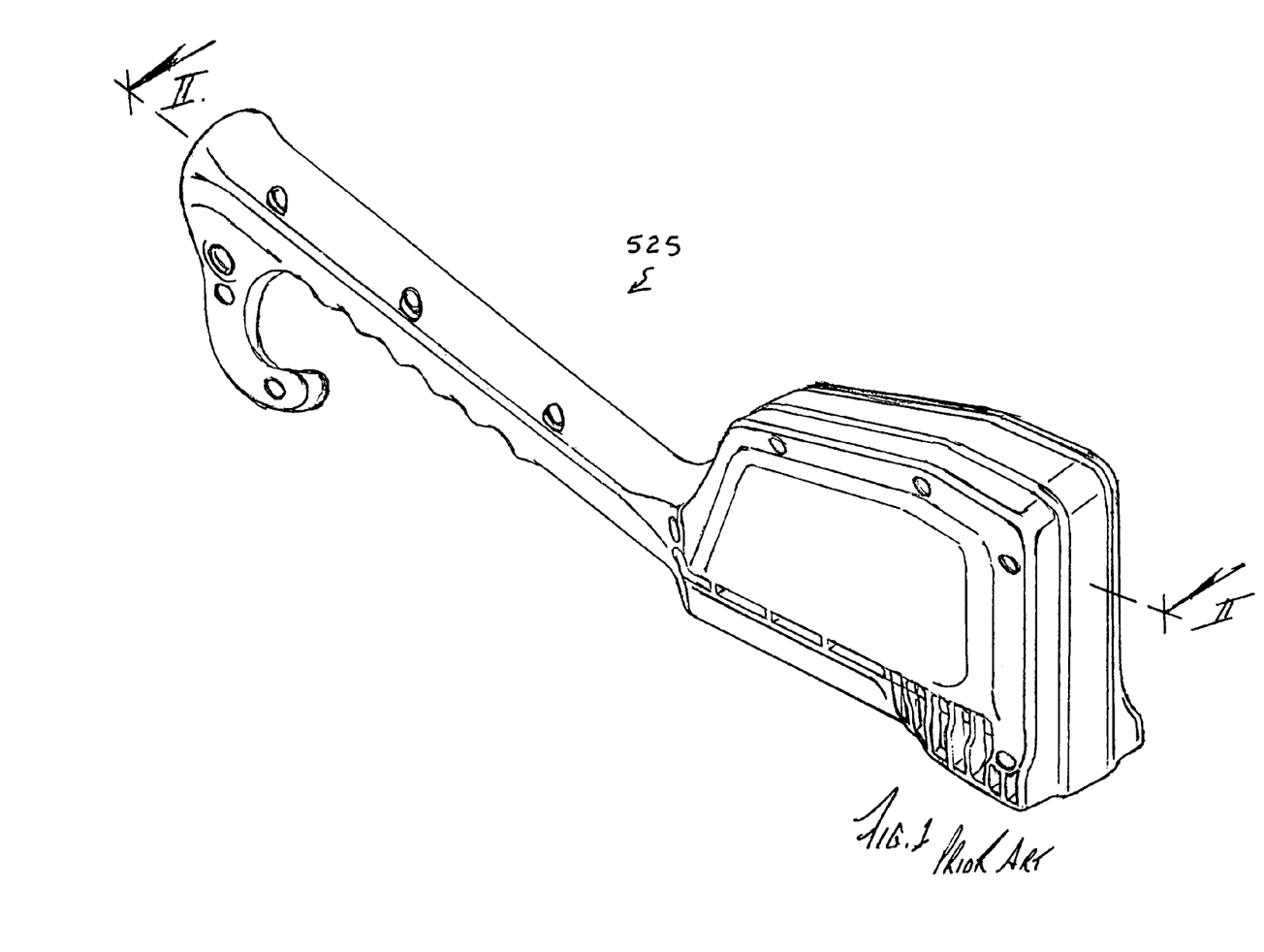
FIG. 1 is a perspective view of a hammer tacker in accordance with the prior art.
Figure 2:
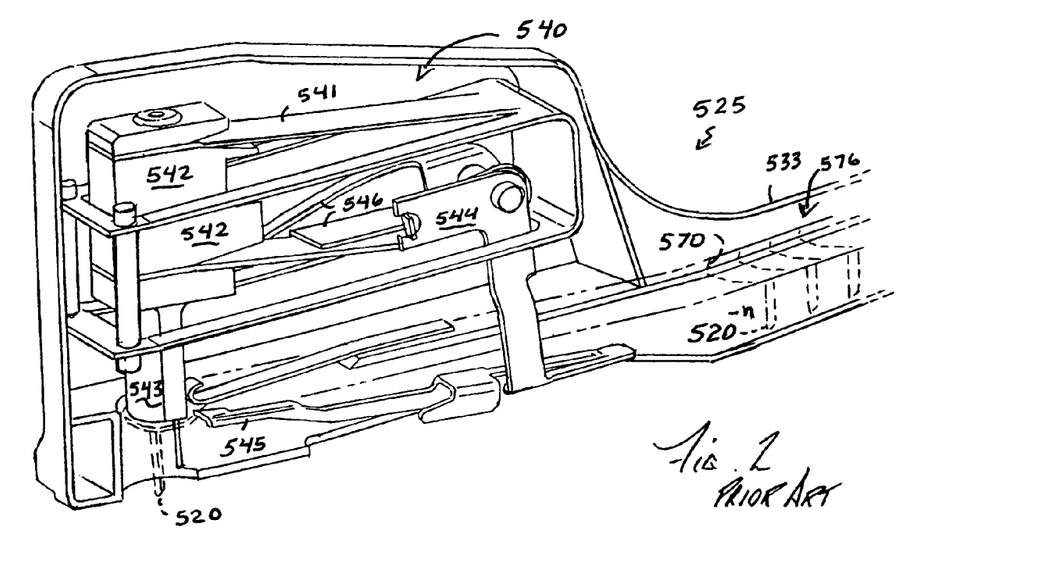
FIG. 2 is an enlarged scale perspective view taken in the direction of arrows II-II in FIG. 1, with the near-side half of the split housing removed to reveal the tack driving-and-feed mechanism(s), wherein portions of the handle are broken away, and a tack in the lead position (eg., the position in the procession from which the ram discharges a tack on the drive or "strike" stroke) is shown in broken lines, other tacks of the strip being shown in broken lines as well in the handle's interior feed track.

To digress briefly, and dwell on FIGS. 1 through 6, they show the culmination of the final (referred to as the third) version of the prototype versions. FIG. 1 shows a hammer tacker 525, fairly comparable to hammer tacker 25 or 125 in U.S. Pat. No. 5,927,922. FIG. 2 is an enlarged scale perspective view taken in the direction of arrows II-II in FIG. 1, wherein the near-side half of the split housing (preferably produced nowadays from plastic) is removed to reveal the tack driving-and-feed mechanism 540, which includes, in its main aspects, a double parallelogram leaf spring 541, a piston 542 held at the vibrating end of the leaf spring 541, a ram 543 extending down from the piston 542, and a rocker-arm/pawl linkage 544/545 actuated by the piston 542. The rocker arm 544 portion terminates in pawl portion 545. A tack 520 in the lead position (eg., the position in the procession from which the ram discharges a tack on the strike stroke) is shown in broken lines, other tacks $520^{-n}$ of the strip 570 being shown in broken lines as well in the handle 533's interior feed track 576.

Figure 3:
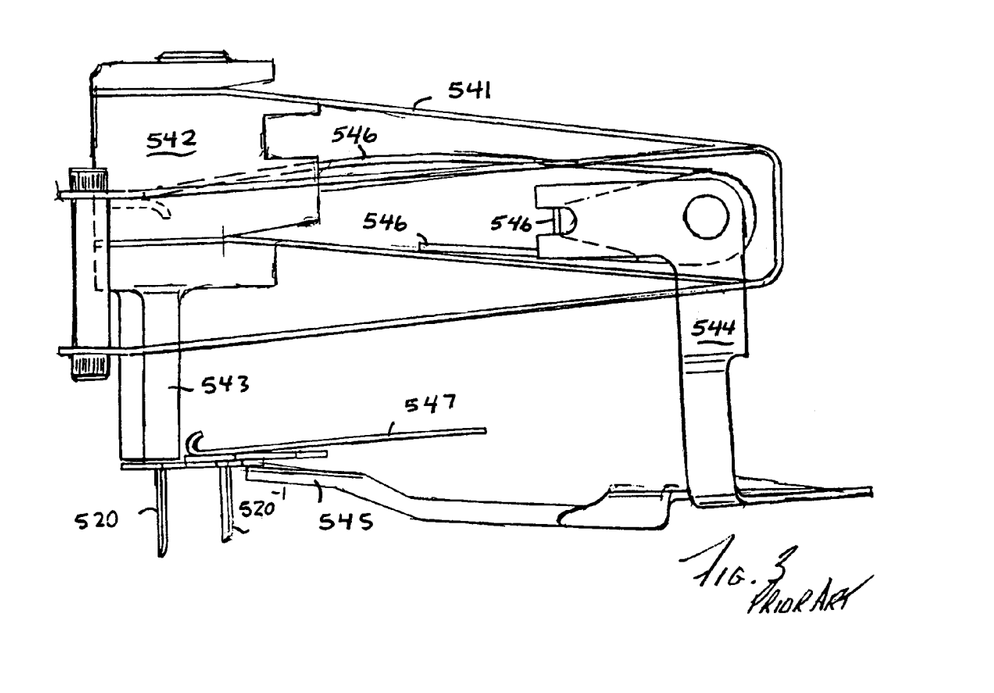
FIG. 3 is a side elevational view of predominantly the tack driving-and-feed mechanisms in isolation.

Each of these prototype versions are generally typified by, namely, a double-parallelogram leaf spring (eg., 541 in FIG. 3), and a reach-around rocker-arm/pawl linkage (eg., 544/545 in FIG. 3). The third prototype version described hereby also has a supplemental spring 546 for the rocker-arm/pawl linkage 544/545. There is also a tack-strip hold-down spring 547 (shown pressing at least on the tack $520^{-n}$ in the next-to-lead position, which immediately succeeds the tack 520 in the lead position). Some of the shortcomings that persist or have arisen in the third version include the following, which are described over the following extended passage.

To begin with, the spring designs are custom, original designs. As such, the spring designs prove challenging to fabricate and nearly impossible to achieve uniformity between one copy to the next. An early design choice was to produce these spring components out of beryllium copper. A factor in favor of this material is its expected longer working life when compared to an equivalent construction out of spring steel.

Nevertheless, regardless if steel or beryllium copper, fabrication of these springs requires layout on and lancing from flat stock, followed by multiple forming steps to produce all the bends and curves. After this, the formed parts have to be heat treated for, among other reasons, returning the material back to serviceable spring material after much degradation thereto occurs through the forming processes. However, industry-specified heat treatments cause distortions, probably in all cases, it being usual that such distortions are readily apparent to by the un-aided eye alone. Hence the parts usually have to be given individual attention after heat treatment to re-tune back to specified dimensional tolerance and performance metrics.

Moreover, each individual custom spring-design is likely overly-complicated in terms of both layout and formation. As for formation especially of the rocker-arm/pawl linkage and its supplemental spring, these involve formation of tricky bends and curves that prove challenging to keep within even a loose dimensional tolerance. As said, dimensional tolerance laxness is only further compounded by a heat treatment that predictably adds distortion. In consequence, it is practically impossible to produce duplicate copies of the same part.

Also, assembly is difficult. FIGS. 2 and 3 shows that the three springs 541, 544/545 and 546 have to be intertwined like a three-dimensional puzzle, and then carefully rested between both halves of the split housing. If the parts as they often do get jarred apart, then a worker has to start over. In fact, experience finds that truly it is a two-worker job to solve this puzzle.

Another shortcoming is that, if during use any of these springs gets deformed through mishap, it is virtually impossible for the customer-owners of the hammer tacker to repair the hammer tacker like new because of the challenge of re-tuning the springs. In fact, the assignee hereof has not really been any more successful at re-tuning springs deformed in the field than customer-owners. Indeed, repairing a broke-down hammer tacker with replacement parts re-encounters a shortcoming described above, namely, that there is virtually no uniformity between copies of the same part, ie., replacement parts. It often happens that after a replacement part is installed, the springs of the hammer tacker under-repair still require individual attention and tuning so that the package of springs as a whole works in concert as designed. For example, perhaps the piston will not return to its fully retracted position, and in consequence the ram's impulse surface will not clear the heads of the tacks in the strip. Without clearance, the tack strip will not advance, the rocker-arm/pawl linkage might stay caught in a strained position. An ill-advised attempt of solving this situation is to whack the hammer tacker as it is intended to be used, except to see if that might shake things loose. The reason that this is ill-advised is that, it risks damaging or in other words deforming any of the delicate springs/linkages. As an aside, the part most vulnerable to damage is the rocker-arm/pawl linkage.

Over the time that was spent refining this thread of designs (eg., the ones involving the double parallelogram spring and the reach-around pawl), it turned out that one attempt to solve a set of shortcomings tended to birth a different set of shortcomings. For example, in order to ensure that the ram's impulse surface clears the plane of the tack heads in the strip, the double parallelogram spring has evolved to provide a substantial force against the piston to keep it steady in its retracted or rest position, as between whacks. However, what also happens is that a substantial pre-load is built into the hammer tacker. The piston is forced so tight against its rest stop that it requires a worker to work that much harder on each whack, a fraction of which is waste just to overcome the resting force. Needless to say, this speeds up worker fatigue and detracts from worker efficiency.

Figures 4, 5, 6:
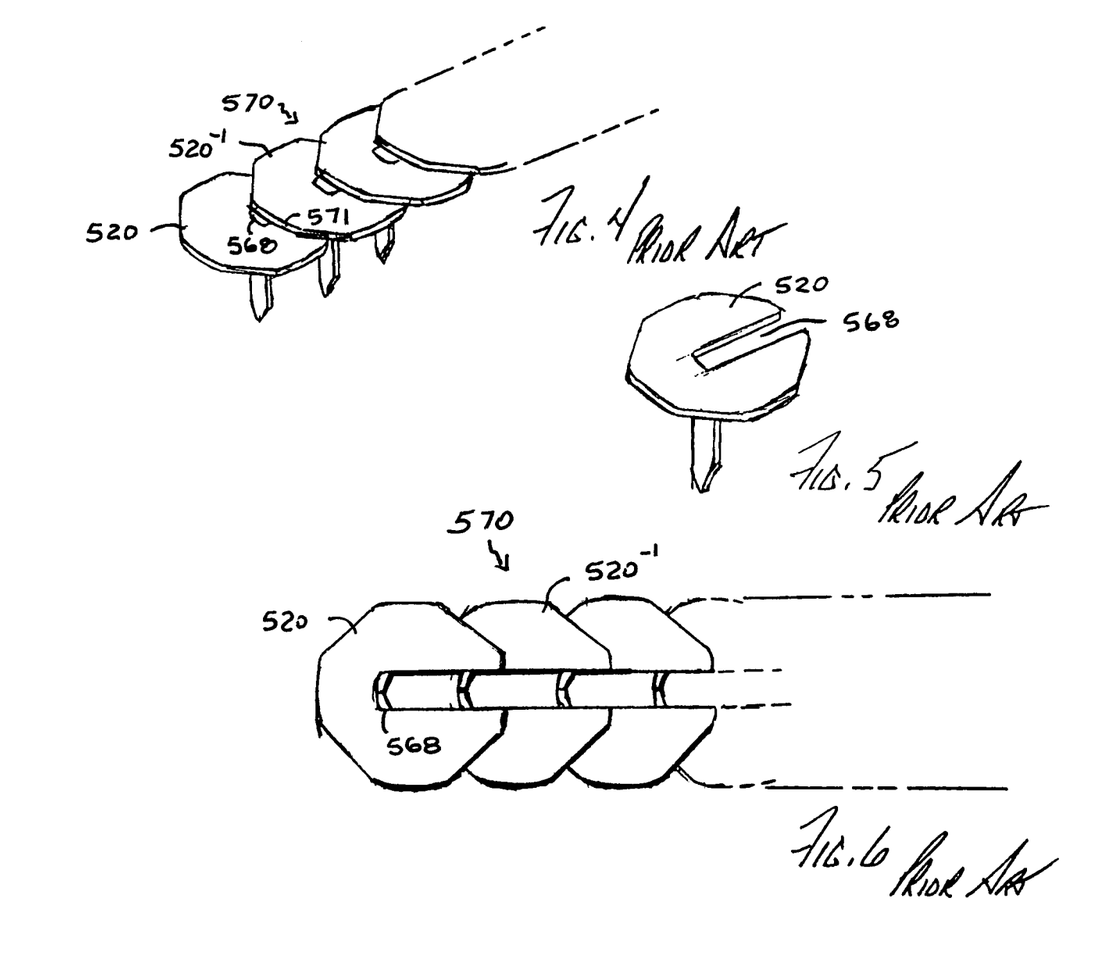
FIG. 4 is a perspective view of a collated strip of tacks in accordance with the prior art, wherein the direction of feed or procession of the strip through the hammer tacker would be right to left in the view.
FIG. 5 is a perspective view comparable to FIG. 4 except showing a single tack in isolation.
FIG. 6 is a bottom plan view of FIG. 4.

FIGS. 4 through 6 are a series of views comparable to FIGS. 8c, 6a and 7a, respectively, in U.S. Pat. No. 5,927, 922. That is, FIG. 4 hereof shows a collated strip of tacks in accordance with the prior art, wherein the direction of feed or procession of the strip through the hammer tacker 525 would be right to left in the view. FIG. 5 shows a single tack 520 in isolation. FIG. 6 is a bottom plan view of FIG. 4. The noteworthy aspect of FIGS. 4 and/or 6 is that, when tacks 520 are collated in the strip 570 according to the prior art, there is virtually no aperture left between the leading edge 571 of a tack head of a succeeding tack (eg., 520$^{-1}$) and the leading edge of the head slot (eg., 568) in its preceding neighbor (eg., 520). This matter will be more particularly dealt with below.

What is needed is an improvement which overcomes various ones of the above-described shortcomings.

It is an object of the invention to eliminate where possible custom design springs in favor of readily available, off-the-shelf parts.

It is an alternative object of the invention to eliminate various heat-treatment steps during fabrication of the improved hammer tacker, it being presumed that the majority of required/advised heat treatments will have already been taken care of by the OEMs of such off-the-shelf parts.

It is an additional object of the invention to impose much closer dimensional tolerances on the springs because of simpler designs which are achieved by simply trimming such off-the-shelf stock to size or, in other words, eliminate overly-complicated spring designs achieved by layout on flat stock, formation into convoluted shapes, heat treatment to render the material serviceable again as a spring component, and then re-tuning the component to compensate for distortions brought on by the heat treatment.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 12 is a bottom plan view comparable to FIG. 11 except taken in the direction and/or along the offset line indicated by arrows XII-XII in FIG. 10.

DETAILED DESCRIPTION OF THE PREFERRED EMBODIMENTS

Figure 7:
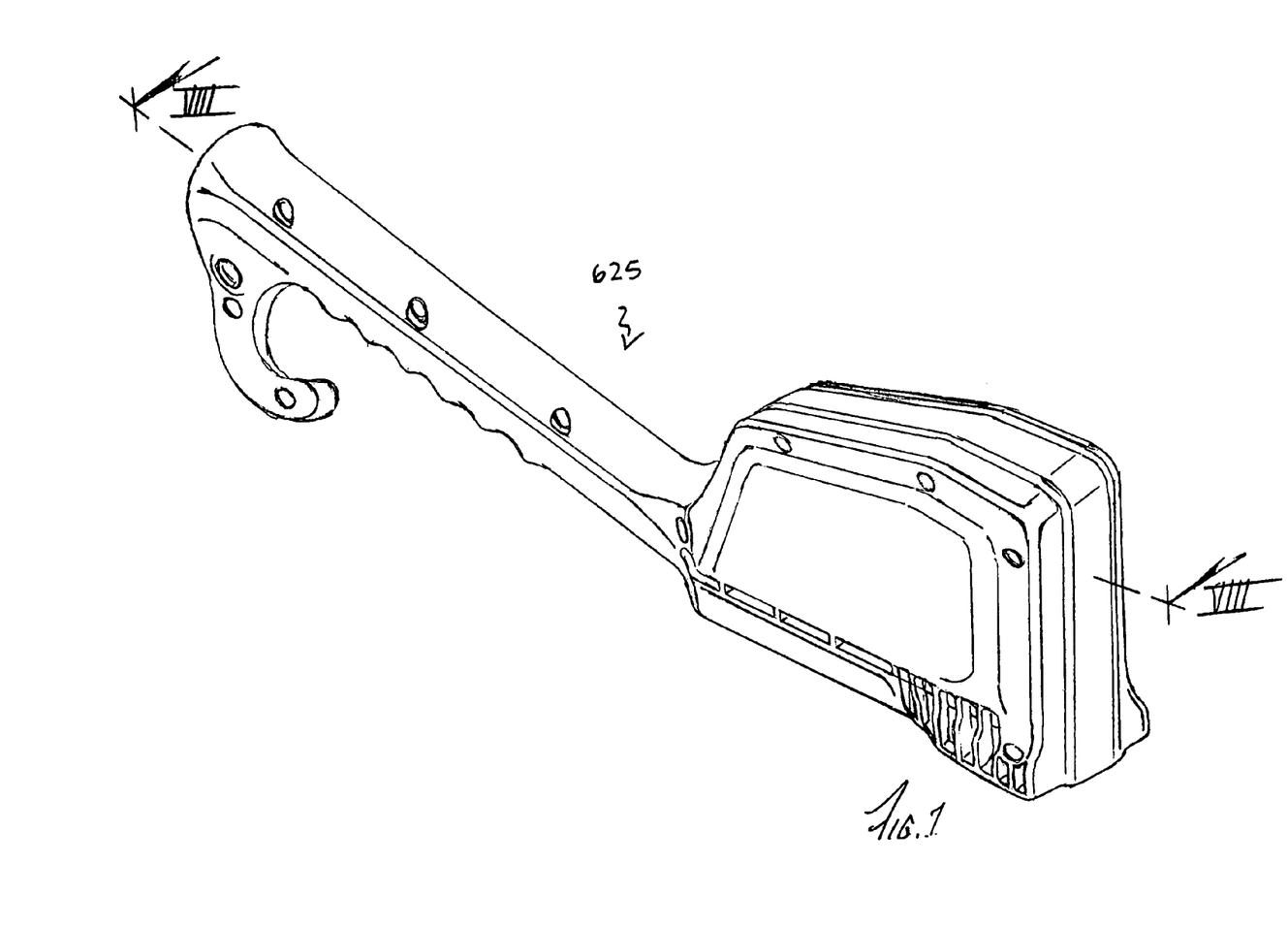
FIG. 7 is a perspective view of a hammer tacker in accordance with the invention.

FIG. 7 shows a hammer tacker 625 in accordance with the invention.

Figure 8:
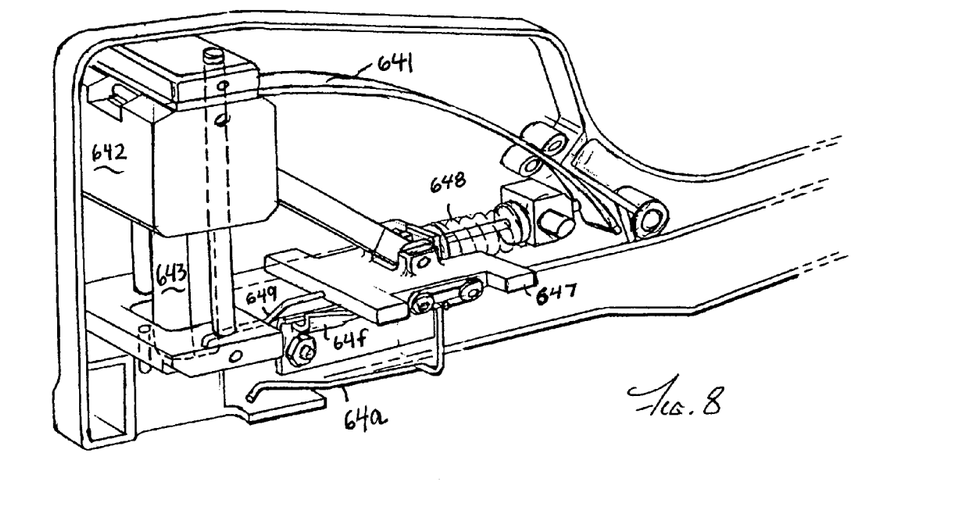
FIG. 8 is an enlarged scale perspective view taken in the direction of arrows VIII-VIII in FIG. 7, with the near-side half of the split housing removed to reveal the tack driving-and-feed mechanism(s), wherein portions of the handle are broken away.

FIG. 8 is an enlarged scale perspective view taken in the direction of arrows VIII-VIII in FIG. 7, and has the near-side half of the split housing removed to better reveal the tack driving-and-feed mechanism(s). Aspects of this include the piston-and-ram unit 642/643, its leaf spring 641, the tack-feeding slide 647, its compression spring 648, its tack driver 649, its stabilizer 64a for the last-tack of all when proceeded to the lead position (eg., the position where the piston-and-ram unit 642/643 strikes it into the target).

Figure 9:
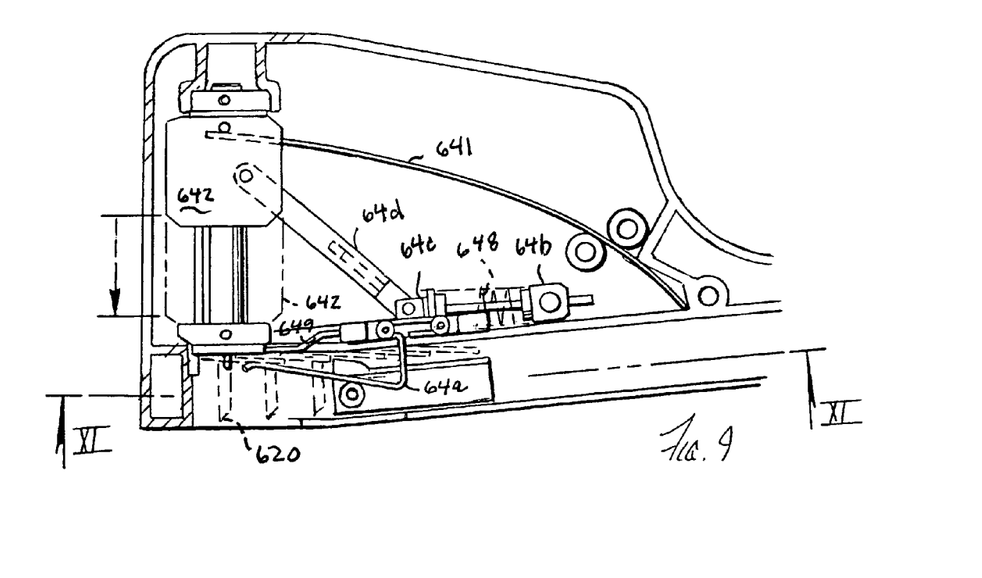
FIG. 9 is a side elevational view of FIG. 8, with several tacks in advance positions (eg., the positions in the procession starting with the lead position and extending backwards from there) are shown in broken lines, wherein the piston-and-ram unit is shown in its fully retracted position and tack-feeding slide mechanism is shown in its full feed position.

FIG. 9 is a side elevational view of FIG. 8. The leaf spring 641 is produced from readily available off-the-shelf flat band spring steel stock. It is simply cut to length. As FIG. 9, shows, this leaf spring is simply constrained as shown without fixture to either of its ends. That is, one or both of its ends are free to slide in their constraints.

The compression spring 648 is anchored against a trunnion 64b. The compression spring extends therefrom to a sliding bracket 64c that provides a pinned connection with one end of telescopic link 64d. The opposite end of telescopic link 64d is pinned to piston 642. Several tacks 620 of an improved design are shown in advance positions (eg., the positions in the procession starting with the lead position 620 and extending backwards from there), as in broken lines, wherein the piston-and-ram unit 642/643 is shown in its fully retracted position and tack-feeding slide 647 is shown in its full feed position.

Figure 10:
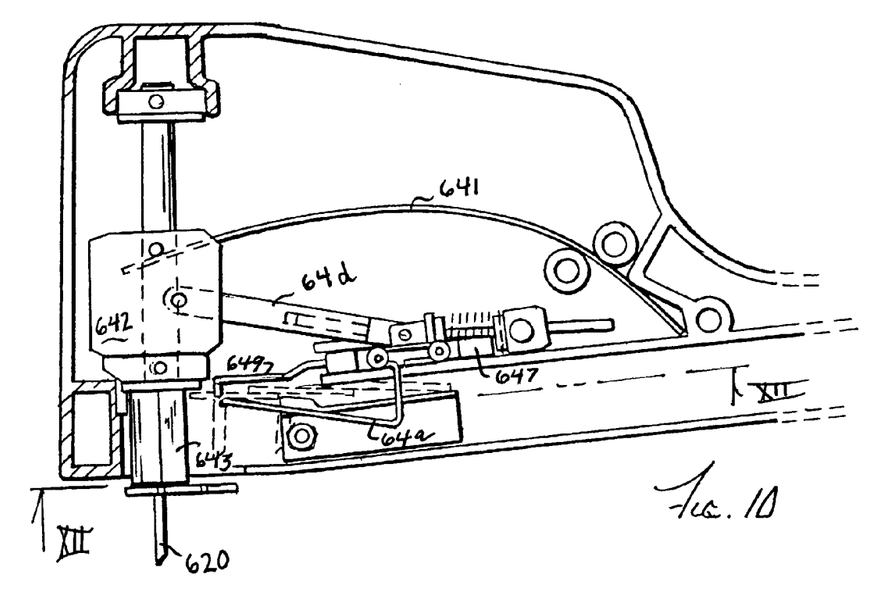
FIG. 10 is a side elevation view comparable to FIG. 9 except showing the piston-and-ram unit in a fully extended position at the end of its drive or "strike" stroke, and also showing the tack-feeding slide mechanism slid to its full recession position as well.

FIG. 10 is a side elevation view comparable to FIG. 9 except showing the piston-and-ram unit 642/643 in a fully extended position at the end of its drive stroke, and also showing the tack-feeding slide 647 slid to its full recession position as well.

Figure 11:
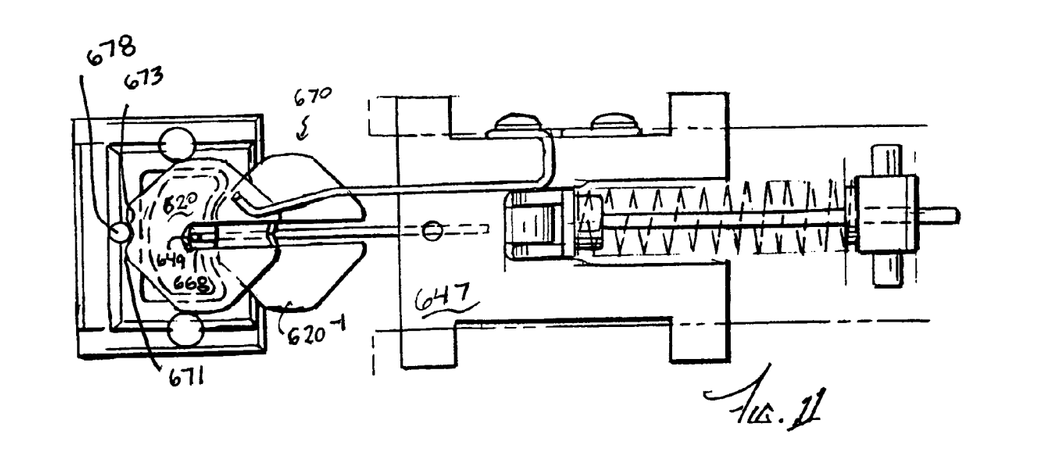
FIG. 11 is a bottom plan view taken in the direction and/or along the offset line indicated by arrows XI-XI in FIG. 9.

FIG. 11 is a bottom plan view taken in the direction and/or along the offset line indicated by arrows XI-XI in FIG. 9. The improved tacks 620 have a notch 673 in their leading edge 671 affording both abutment against a terminal stop 678, as well as the following inventive aspect.

That is, the notch 673 affords both denser packing (or more closely spaced compacting) of the tacks 620 of the strip 670 as well as opens access to the slide 647's driver 649 to insert through the notch of the tack $620^{-1}$ in the next-to-lead position and engage the leading closed-end of the slot 668 in the tack 620 that was incrementally advanced from the next-to-lead position to, ultimately, the lead position. In more technical language, this portion of the of the slot 668 can be termed a "pallet." Hence the slide 647's driver 649 escapably engages the pallet 64e to advance the tack in the next-to-lead position to the lead position.

Indeed, FIG. 12 shows that the driver 649 has escaped the tack in the lead position, now struck clear from the hammer tacker, and has receded prepatory to advance and engage the pallet 64e of the tack 620-1 in the next-to-lead position, about to be advanced to the lead position.

Figure 13:
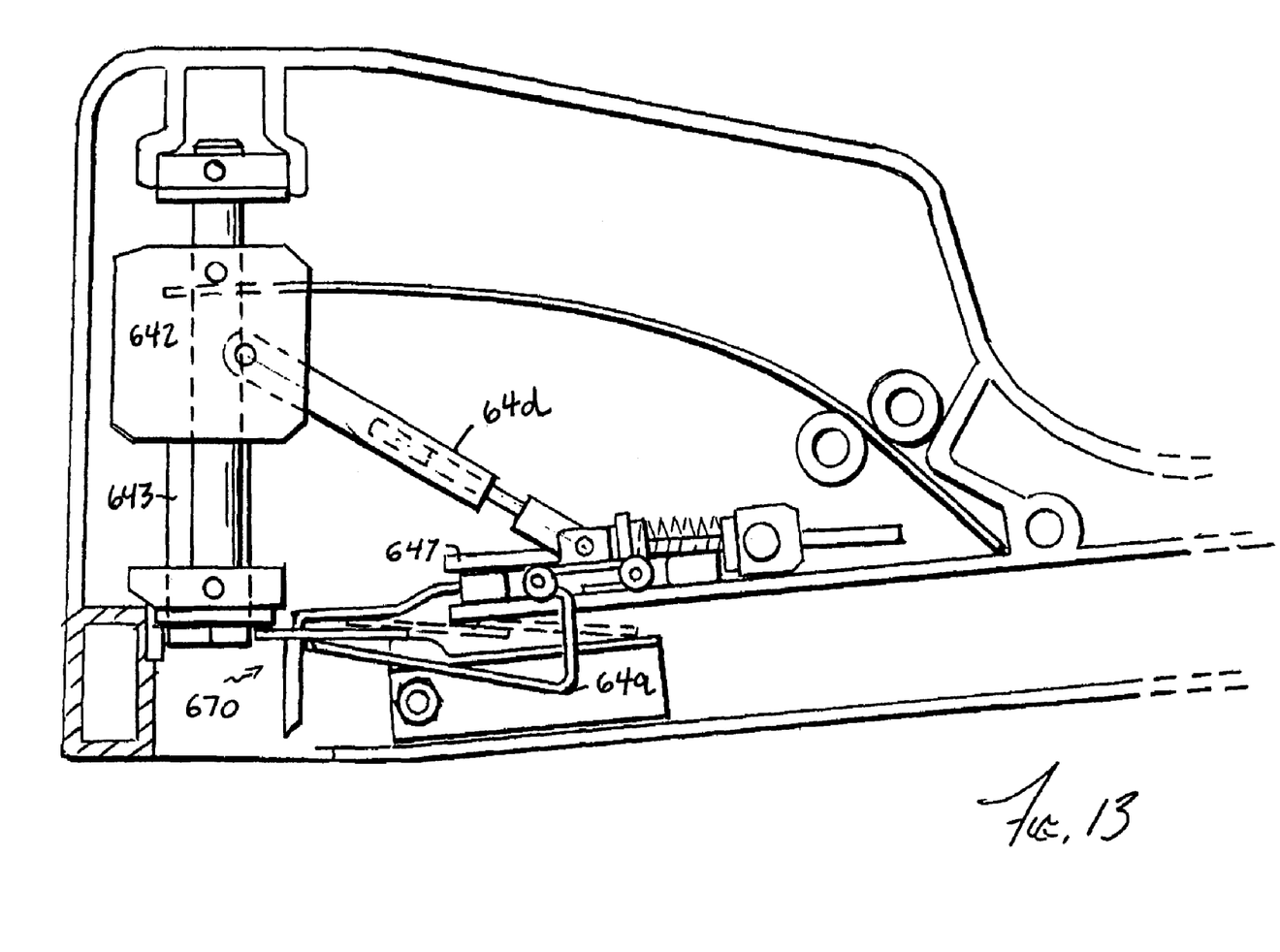
FIG. 13 is a side elevational view comparable to FIG. 10 except showing the piston-and-ram unit almost all the way retracted back to its fully retracted (eg., rest) position yet still not affording clearance for advancing the procession of tacks, such that the tack-feeding slide mechanism has to idle in the same fully extended position as shown in FIG. 10, wherein a push link that interconnects the piston-and-ram unit with the tack-feeding slide mechanism is shown as telescopic to allow for the expanding distance between its pinned ends.
Figure 16:
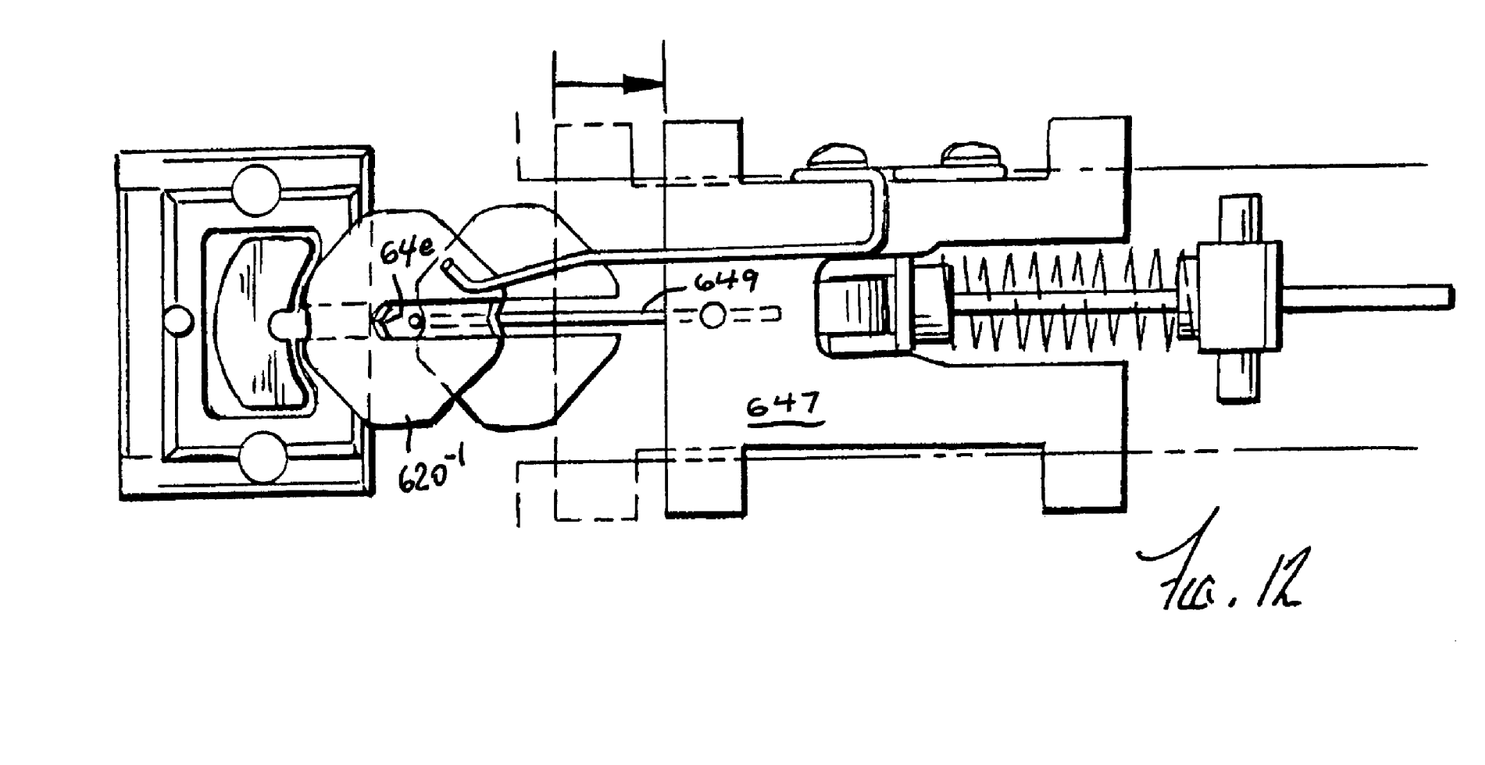

FIG. 13 is a side elevational view comparable to FIG. 10 except showing the piston-and-ram unit almost all the way retracted back to its fully retracted (eg., rest) position yet still not affording clearance for advancing the procession of tacks 670, such that the tack-feeding slide 647 has to idle in the same fully extended position as shown in FIG. 10, wherein push link 64d is shown interconnecting the piston-and-ram unit 642/643 with the tack-feeding slide 647. The push link 64d is telescopic as shown to allow for an expanding distance between its pinned ends during the retraction stroke of the piston-and-ram unit 642/643, while the tack-feeding slide 647 has to idle in place until the ram 643 provides clearance for the advancement of the tack strip 670. Hence the slide 647's feed stroke generally lags after a pause behind the piston's retraction stroke.

The following summarizes aspects of the foregoing. The inventive hammer tacker combines with a strip of inventive tacks to achieve the following. That is, of the strip of tacks, each has a shank extending between a tack head and a plunging end, and are secured to each other to maintain relative fixed spacings in the strip until discharged. Unlike what is disclosed in U.S. Pat. No. 5,927,922, the inventive tack strip 670 is secured not by a polymeric film covering over the slots 668 but a pair of lengths of tape wrapped around the outboard edges of the strip 670, which leaves both the procession of slots 668 and their associated pallets 64e exposed, so as not to impede the engagement of the slide 647's escapable driver 649.

The present hammer tacker has a hammer head that defines a strike surface, as well as the tack-driving piston, the tack-feeding slide mechanism, and a handle for a user to swing the hammer tacker in order to strike the strike surface against a target. The strike surface defines at least in part a tack outlet.

The tack-driving piston is arranged for cycling between a drive and retraction stroke on a path of action to drive a tack into the target.

As comparably disclosed in U.S. Pat. No. 5,927,922, the hammer tacker is formed with a tack course-way that intersects said path of action in a terminus, for coursing the strip of tacks onward to the terminus.

The tack-feeding mechanism is arranged for cycling between a recession and feed stroke to feed the tack in a next-to-lead position to the lead position after the preceding tack in the lead position is driven by the piston through the outlet. The tack-feeding mechanism furthermore is arranged to have an escaping driver for engaging the pallet of the tack in the next-to-lead position at least during the feed stroke in order to feed that tack to the lead position, as well as at least during the recession stroke, for escaping the pallet of that tack that just succeeded to the lead position and then receding to engage the pallet of the tack that succeeds to the next-to-lead position, if any. Wherein the piston and tack-feeding mechanism are linked by the telescopic link such that the piston's drive stroke generally coincides with the tack-feeding mechanism's recession stroke as well as such that the tack-feeding mechanism's feed stroke generally lags after a pause behind the piston's retraction stroke.

FIG. 8, among others, shows that the hammer tacker additionally comprises an anti-retraction ratchet 64f, so that the tack strip 670 cannot recede in reverse, but only proceed in the advance direction. Also, the stabilizer 64a indicated in FIG. 9 (and shown in other views) comes into play for the last tack of all in the tack strip 670. Indeed, as better shown by FIG. 13, the last tack of all requires special considerations, which are supplied by the stabilizer 64a as shown.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A tool for tacking tacks that have a longitudinal shank extending from a laterally enlarged head to a plunging end wherein each tack head provides a lateral abutment surface; said tool comprising:
   a body defining a course for a procession of said tacks; said course terminating in an expulsion station for a tack occupying a lead position of the procession, and being arranged to guide a successive tack, if any, to the lead position occupancy in the expulsion station;
   a piston having a cycle comprising a drive stroke for expelling the tack in the expulsion station, and a retraction stroke;
   a bias applicator for biasing the piston normally to a retracted position; and
   a mechanism actuated by the piston's cycle for incrementally advancing said successive tack, if any, to the lead position occupancy in the expulsion station after the piston's drive stroke;
   wherein said mechanism advances said successive tack to the expulsion station by accessing the lateral abutment surface thereof of a tack succeeding said successive tack; and
   wherein the bias applicator is a combination of springs including at least one compression spring;
   wherein a first end of a push link is pivotably connected to the piston and a second end of said push link is pivotably connected to the at least one compression spring; and
   wherein the at least one compression spring engages and actuates the mechanism for incrementally advancing the successive tack to the expulsion station.

2. A manual tool comprising a tool according to claim 1 wherein, given a worker tacking a tack by pounding the tool against a target, the tool automatically feeds the succeeding tack to the expulsion station for a subsequent tacking use of the tool.

3. Tacks and tacking tool combination comprising a tool according to claim 1, wherein each tack head's lateral abutment surface comprises a peripheral edge of the periphery of the tack head or of an opening in the tack head.

4. The combination of claim 3 wherein said mechanism slides on the top of the head of the tack, if any and until the last tack, succeeding to the next-to-lead position during portions of the recession stroke.

5. The combination of claim 3 wherein each tack head further comprises a clearance access, and the procession is arranged such that a trailing tack's head in the procession overlaps the immediately preceding tack's head, and the clearance access in the trailing tack head aligns for overhead clearance to the lateral abutment surface of the immediately preceding tack.

6. The tool according to claim 1 wherein the bias applicator is a spring for yieldingly opposing the piston's drive stroke.

7. The tool according to claim 1 wherein the bias applicator applies a non-linear yielding opposition to the piston's drive stroke such that the opposition force applied against the piston's position decreases at least in the range of the piston's cycle where the piston approaches the drive stroke extreme therefor.

8. A tool for tacking tacks, comprising:
   a body defining a course for a procession of tacks that terminates in an expulsion station for the lead tack of the procession;
   a piston having a cycle comprising a drive stroke for expelling the lead tack in the expulsion station, and a retraction stroke;
   a bias applicator for biasing the piston normally to a retracted position; and
   a mechanism actuated by the piston's cycle for loading the expulsion station with a succeeding tack, if any left, after expulsion of the preceding lead tack;
   wherein the bias applicator is a combination of springs including at least one compression spring;
   wherein a first end of a push link is pivotably connected to the piston and a second end of said push link is pivotably connected to the at least one compression spring; and
   wherein the at least one compression spring engages and actuates the mechanism for incrementally advancing the succeeding tack to the expulsion station.

9. A manual tool comprising a tool according to claim 8, wherein, given a worker tacking a tack by pounding the tool against a target, the tool automatically feeds the succeeding tack to the expulsion station for a subsequent tacking use of the tool.

10. Tacks and tacking tool combination comprising a tool according to claim 8, wherein the procession of tacks are chained together such that loading the expulsion station with any succeeding tack drags the procession as whole, if any following tacks remain.

11. The tool according to claim 8 wherein the bias applicator applies a non-linear yielding opposition to the piston's drive stroke such that the opposition force applied against the piston's position decreases at least in the range of the piston's cycle where the piston approaches the drive stroke extreme therefor.

12. Fasteners and fastening tool combination comprising:
   a procession of fasteners, each fastener having a shank extending between an apertured head and a plunging end;
   a fastening tool having a feedway for the procession of fasteners terminating in an expulsion destination for occupancy by one fastener at a time, a plunger having an operative cycle comprising a retraction stroke, and a drive stroke for forcefully expelling a fastener loaded in the expulsion destination with the plunging end thereof leading the way, an operative loading mechanism for re-loading the expulsion destination with a succeeding tack, and a bias applicator comprising a combination of a at least one compression spring with at least one other spring for yieldingly opposing the plunger's drive stroke;
   wherein a first end of a push link is pivotably connected to the piston and a second end of said push link is pivotably connected to the at least one compression spring; and
   wherein the at least one compression spring engages and actuates the operative loading mechanism for re-loading the expulsion destination with said succeeding tack.

13. The combination according to claim 12 wherein, given a worker fastening a fastener by pounding the tool against a target, the tool automatically feeds the succeeding fastener to the expulsion destination for a subsequent fastening use of the tool.

14. The combination according to claim 12, wherein the procession of fasteners are attached such that advancing a forward fastener drags the following fasteners as a whole.

* * * * *